US012764463B2

(12) United States Patent
Wan et al.

(10) Patent No.: US 12,764,463 B2
(45) Date of Patent: Oct. 13, 2026

(54) BLUETOOTH SYNCHRONIZATION METHOD AND BLUETOOTH SYNCHRONIZATION SYSTEM

(71) Applicant: MediaTek Singapore Pte. Ltd., Singapore (SG)

(72) Inventors: Jilin Wan, Wuhan (CN); Yun Zhang, Wuhan (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 250 days.

(21) Appl. No.: 18/798,844

(22) Filed: Aug. 9, 2024

(65) Prior Publication Data

US 2025/0373978 A1 Dec. 4, 2025

(30) Foreign Application Priority Data

May 31, 2024 (CN) ......................... 202410702866.0

(51) Int. Cl.
*H04R 3/00* (2006.01)
*H04L 7/00* (2006.01)

(52) U.S. Cl.
CPC ............. *H04R 3/00* (2013.01); *H04L 7/0012* (2013.01); *H04R 2420/07* (2013.01)

(58) Field of Classification Search
CPC ..... H04R 3/00; H04R 2420/07; H04L 7/0012; H04N 21/43637
USPC ........................................................... 381/92
See application file for complete search history.

(56) References Cited

U.S. PATENT DOCUMENTS

2015/0092642 A1* 4/2015 Geboff .................. H04L 69/329 370/350
2019/0045304 A1* 2/2019 Bhalla ...................... H04R 3/12
2020/0137699 A1* 4/2020 Girardier ............ H04W 56/001

* cited by examiner

*Primary Examiner* — Paul Kim
(74) *Attorney, Agent, or Firm* — Winston Hsu

(57) ABSTRACT

A Bluetooth synchronization method includes acquiring a Bluetooth synchronization point and decoded audio data according to an isochronous data packet from a Bluetooth dongle, converting the Bluetooth synchronization point acquired from the Bluetooth dongle into an application processor (AP) synchronization point of an AP according to a clock map of the Bluetooth dongle and the AP, and processing the decoded audio data to generate playback-ready audio data according to the AP synchronization point. The Bluetooth synchronization method is applied to an audio receiver. The audio receiver comprises the Bluetooth dongle and the AP. The Bluetooth dongle and the AP have different clock sources.

15 Claims, 10 Drawing Sheets

BLUETOOTH SYNCHRONIZATION METHOD AND BLUETOOTH SYNCHRONIZATION SYSTEM

BACKGROUND

With the rapid development of science and technology, various audio communications are adopted in our daily life. For example, recently published Bluetooth Low Energy (LE) Audio specifications may open up a new era of possibilities for wireless audio. They can apply to various wireless ear buds, and provide a toolkit allowing designers to extend their designs into new realms of audio applications. The Bluetooth LE Audio can provide a wide range of applications offering enhanced audio quality and topology at the lowest possible power.

However, when two or more chips are applied to the Bluetooth LE Audio system, it is important to maintain data synchronization among different chips. For example, in a receiver, all receivers are required to output a sound signal synchronously. For example, a sender and a receiver may be required to output a sound signal simultaneously.

Therefore, developing a Bluetooth synchronization method and a Bluetooth synchronization system may be an important design issue.

SUMMARY

In an embodiment of the present disclosure, a Bluetooth synchronization method is disclosed. The Bluetooth synchronization method comprises acquiring a Bluetooth synchronization point and decoded audio data according to an isochronous data packet from a Bluetooth dongle, converting the Bluetooth synchronization point acquired from the Bluetooth dongle into an application processor (AP) synchronization point of an AP according to a clock map of the Bluetooth dongle and the AP, and processing the decoded audio data to generate playback-ready audio data according to the AP synchronization point. The Bluetooth synchronization method is applied to an audio receiver. The audio receiver comprises the Bluetooth dongle and the AP. The Bluetooth dongle and the AP have different clock sources.

In another embodiment of the present disclosure, a Bluetooth synchronization method is disclosed. The Bluetooth synchronization method comprises acquiring a Bluetooth synchronization point from a Bluetooth dongle, converting the Bluetooth synchronization point acquired from the Bluetooth dongle into an AP synchronization point of the AP according to a clock map of the Bluetooth dongle and the AP, and processing an original audio data having a first duration to generate an unencoded audio data having a predetermined second duration to an encoder, wherein the first duration is determined according to the AP synchronization point. The Bluetooth synchronization method is applied to an audio sender. The audio sender comprises the Bluetooth dongle and the AP. The Bluetooth dongle and the AP have different clock sources. The audio sender is configured to play the original audio data having the first duration at a target synchronization point. The target synchronization point is generated by delaying a predetermined presentation delay from the AP synchronization point.

In another embodiment of the present disclosure, a Bluetooth synchronization system is disclosed. The Bluetooth synchronization system comprises a Bluetooth dongle and an AP coupled to the Bluetooth dongle. The AP is configured to perform the following steps: acquiring a Bluetooth synchronization point and decoded audio data according to an isochronous data packet from a Bluetooth dongle, converting the Bluetooth synchronization point acquired from the Bluetooth dongle into an AP synchronization point of the AP according to a clock map of the Bluetooth dongle and the AP, and processing the decoded audio data to generate playback-ready audio data according to the AP synchronization point. The Bluetooth dongle and the AP are within an audio receiver, and have different clock sources.

These and other objectives of the present disclosure will no doubt become obvious to those of ordinary skill in the art after reading the following detailed description of the preferred embodiment that is illustrated in the various figures and drawings.

DETAILED DESCRIPTION

In Bluetooth (BT) audio devices, there may be various clock sources. Asynchronous clocks between different clock sources often result in suboptimal synchronization of audio playback. The proposed solution herein provides a method for synchronization, enabling multiple audio receivers and/or transmitters to synchronize audio playback with increased accuracy. For example, the synchronization standard is within ±125 microseconds (us). The embodiment is applicable to the following scenarios: audio devices (for example, audio receivers and/or transmitters) may include a Bluetooth dongle and an application processor (AP), wherein the Bluetooth dongle and the application processor each have independent clock sources. For instance, the Bluetooth dongle and the AP are two separate chips. In the present embodiment, the Bluetooth dongle may be a Bluetooth transceiver chip, capable of both transmitting and receiving Bluetooth signals. The AP, which is integrated within a System on Chip (SoC), manages the overall operations of the audio device. The audio device in this context refers to any device that can either receive or transmit audio via Bluetooth connectivity. Examples of such devices include Bluetooth speakers, which operate as audio receivers, and smartphones, which can function as audio transmitters. These devices are designed to seamlessly integrate with the Bluetooth dongle and AP to provide a comprehensive wireless audio experience for the user.

Figure 1:
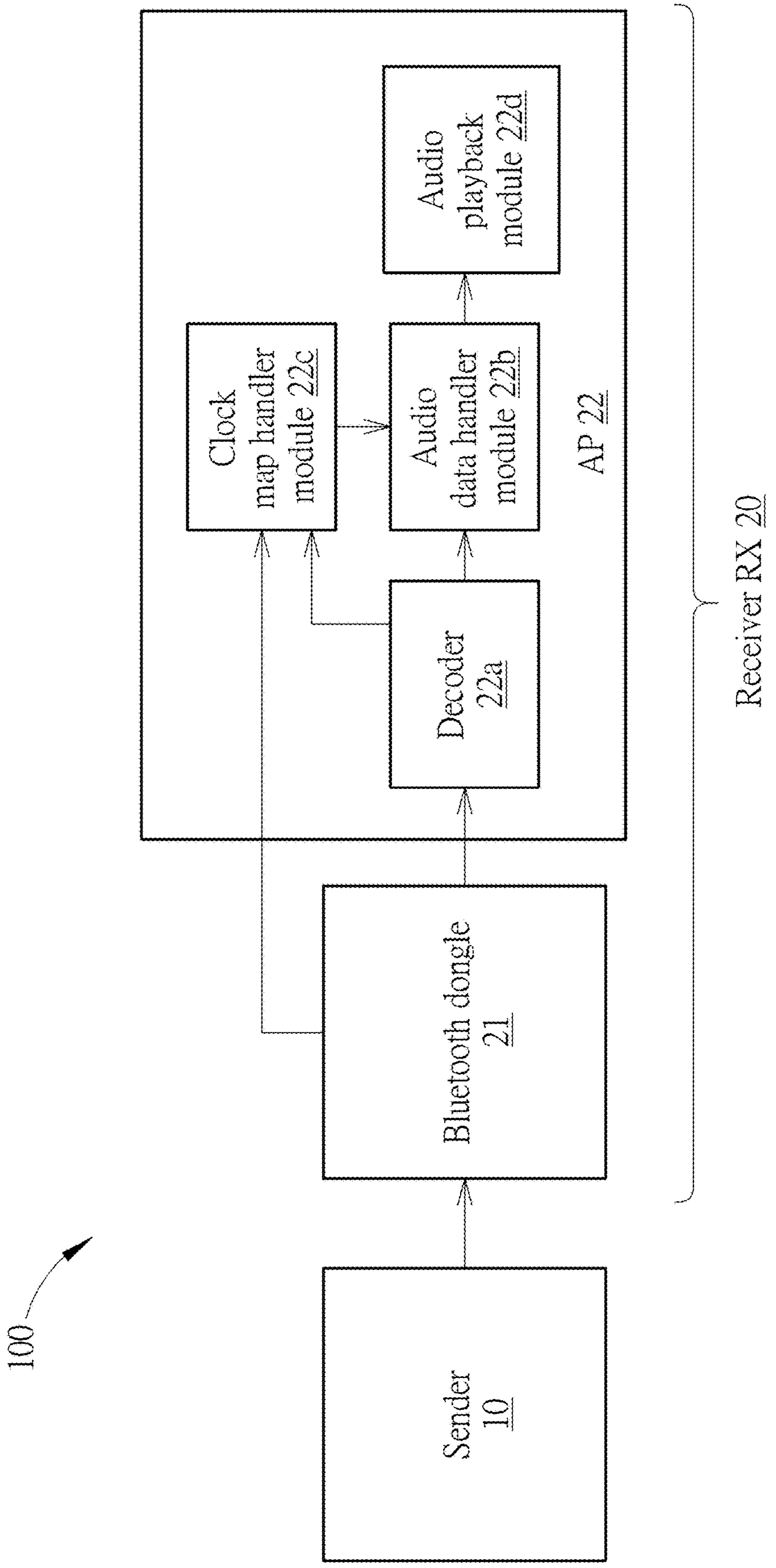
FIG. 1 and FIG. 2 are block diagrams of a Bluetooth synchronization system according to an embodiment of the present disclosure.
Figure 2:
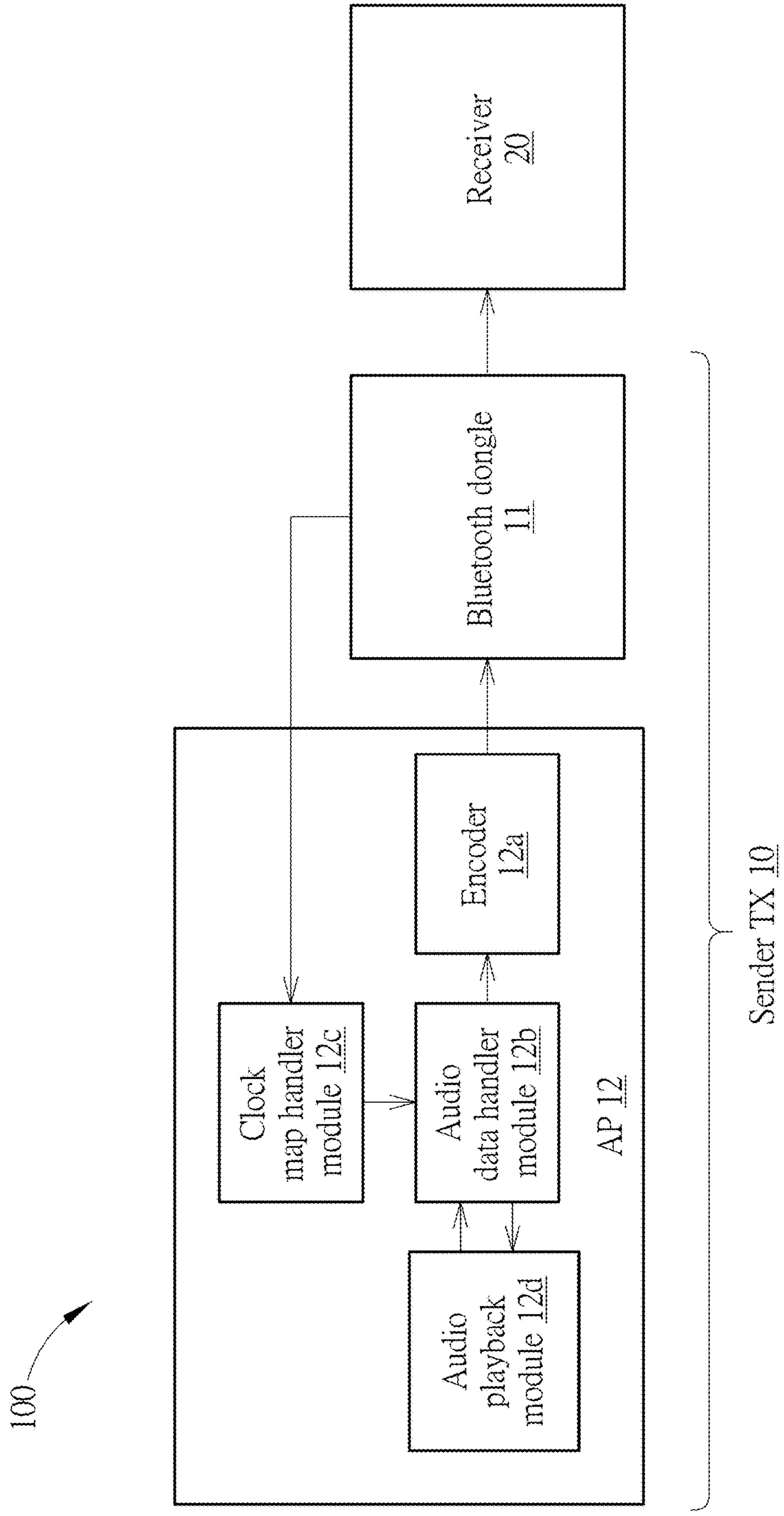

FIG. 1 and FIG. 2 are block diagrams of a Bluetooth synchronization system 100 according to an embodiment of the present disclosure. The Bluetooth synchronization system 100 can be partitioned into two sides, such as a receiver (RX) 20 in FIG. 1 and a sender (TX) 10 in FIG. 2. The receiver (RX) 20 is used for receiving audio data transmitted from the sender (TX). The sender (TX) 10 is used for transmitting the audio data to the receiver (RX) 20. In FIG. 1, the receiver (RX) 20 includes a Bluetooth dongle 21 and an application processor (AP) 22, wherein the Bluetooth dongle 21 and the AP 22 have individual and different clock sources. The AP 22 is coupled to the Bluetooth dongle 21. Clock information (such as running times illustrated later) can be communicated from the Bluetooth dongle 21 to the AP 22 through a general-purpose input/output (GPIO) communication flow. For example, at each predetermined interval, the AP 22 issues a test commands interface (TCI) command to the Bluetooth dongle 21 via a bus interface (such as USB, SDIO, etc.) to initiate the reading of the running time of the Bluetooth dongle 21. In response to the reception of the TCI command, the Bluetooth dongle 21 reads its running time (hereinafter, referred to as BT running time for simplicity) and sets a power level of the GPIO interface to a predefined level (for example, setting the GPIO interface to a high power level). In one example, the power level may be a voltage level or a current level. Consequently, upon detecting the predefined power level at the GPIO interface, the AP 22 immediately reads its own running time (hereinafter, referred to as AP running time for simplicity). On the other hand, the Bluetooth dongle 21 transmits the acquired BT running time back to the AP 22 through the bus interface. In this manner, over time, the AP 22 acquires a set of BT running time and the corresponding AP running time at each predetermined interval (e.g., every 1 second), thereby establishing a clock map of the Bluetooth dongle 21 and the AP 22. It should be understood that the predetermined interval is timed based on the clock source of the AP.

The AP 22 may include a decoder 22*a*, an audio data handler module 22*b*, a clock map handler module 22*c*, and an audio playback module 22*d*. In the receiver (RX) 20, the AP 22 can acquire a Bluetooth synchronization point based on an isochronous (ISO) data packet from the Bluetooth dongle 21. For example, the decoder 22*a* is configured to parse and decode the ISO data packet from the Bluetooth dongle 21 to obtain decoded audio data for the audio data handler module 22*b* and a Bluetooth synchronization point for the clock map handler module 22*c*. In other words, the decoded audio data and the Bluetooth synchronization point can be obtained based on the ISO data packet. It should be noted that the audio data described in the present disclosure refers to packetized audio data, that is, the audio data having a time duration can be obtained from one ISO data packet. Then, the AP 22 (specifically, the clock map handler module 22*c*) can convert the Bluetooth synchronization point into an AP synchronization point of the AP 22 according to a clock map of the Bluetooth dongle 21 and the AP 22. Then, the AP 22 (specifically, the audio handler module 22*b*) can process the decoded audio data for generating a playback-ready audio data according to the AP synchronization point (for example, according to two adjacent AP synchronization points), for example, utilizing data compensation compression algorithm. Hence, in the receiver (RX) 20, audio data can be synchronized for avoiding under-run or over-run issues under different clocks of the AP 22 and the Bluetooth dongle 21. Therefore, by adopting the scheme proposed by the present disclosure, when multiple receivers are applied, although each receiver includes its AP and Bluetooth dongle having different clock sources, they are still able to synchronize audio output, thereby enhancing the user experience.

In FIG. 2, the sender (TX) 10 includes an AP 12 and the Bluetooth dongle 11. The AP 12 is coupled to the Bluetooth dongle 11. As mentioned above, similarly, clock information (such as running times illustrated later) can be communicated from the Bluetooth dongle 11 to the AP 12 through a GPIO communication flow. The AP 12 may include an encoder 12*a*, an audio data handler module 12*b*, a clock map handler module 12*c*, and an audio playback module 12*d*. In the proposed embodiment, the AP (12 or 22) can acquire an audio data interval (referred as a PCM interval) and an isochronous (ISO) data interval (can also referred as the ISO interval). In the embodiment, the isochronous data interval is a predetermined value or time duration (such as 30 ms), which may be predetermined through negotiation between the sender 10 and the receiver 20, stored values, standard definitions, or the like. For example, the isochronous data interval refers to a time interval between two consecutive ISO data. In one example, the isochronous data interval can also be regarded as a time duration for one packet of ISO data. Although the ISO data interval is fixed and predetermined, its value is timed based on the clock source of the Bluetooth dongle, as the ISO data is processed through the Bluetooth dongle. Further, the audio data interval is derived dynamically according to the adjacent AP synchronization points. In one example, the audio data interval can be regarded as a duration for a single packet of audio data (such as, original or decoded audio data illustrated later), for example, 29.9 ms, 30.1 ms, 29.95 ms, 30.05 ms. In the disclosed embodiment, the original audio data in the sender 10 and/or the decoded audio data in the receiver 20 can be adjusted based on the ISO data interval and the audio data interval (for example, utilizing data compensation compression algorithm or audio insertion and deletion techniques) to mitigate audio synchronization issues caused by the lack of clock source synchronization between the AP and the Bluetooth dongle.

In the sender (RX) 10, the AP 12 (specifically, the clock map handler module 12*c*) can acquire a Bluetooth synchronization point from the Bluetooth dongle 11, and convert the Bluetooth synchronization point acquired from the Bluetooth dongle 11 into an AP synchronization point of the AP 12 according to a clock map of the Bluetooth dongle 11 and the AP 12. In one embodiment, for the sender 10, the first Bluetooth synchronization point may be acquired from the Bluetooth dongle 11, and the next Bluetooth synchronization point Yb(n+1) can be determined based on the previous Bluetooth synchronization point Yb(n) and the ISO data interval, for example, Yb(n+1)=Yb(n)+the ISO data interval. the AP 12 (specifically, the audio data handler module 12*b*) can retrieve an original audio data having a first duration from a buffer which may be located within the audio playback module 12*d*, wherein the first duration is determined according to two adjacent AP synchronization points. Then, the AP 12 (specifically, the audio data handler module 12*b*) can process the original audio data having a first duration for generating an unencoded audio data having a predetermined second duration (i.e., a value of the ISO data interval). Further, the unencoded audio data is encoded by the encoder 12*a*, and the encoded audio data is sent to the Bluetooth dongle 11. In the other side, the original audio data having the first duration is played by the audio playback module 12*d* of the AP 12 for playing sound at a target synchronization point. Here, the target synchronization point can be defined by delaying a predetermined presentation delay from the AP synchronization point of the AP 12. Hence, in the sender (TX) of the Bluetooth synchronization system 100, audio data can be synchronized to avoid under-run or over-run issues under different clocks of the AP 12 and the Bluetooth dongle 11. In the proposed scheme, the sender (TX) 10 and the receiver (RX) 20 can play sound simultaneously.

Figure 3:
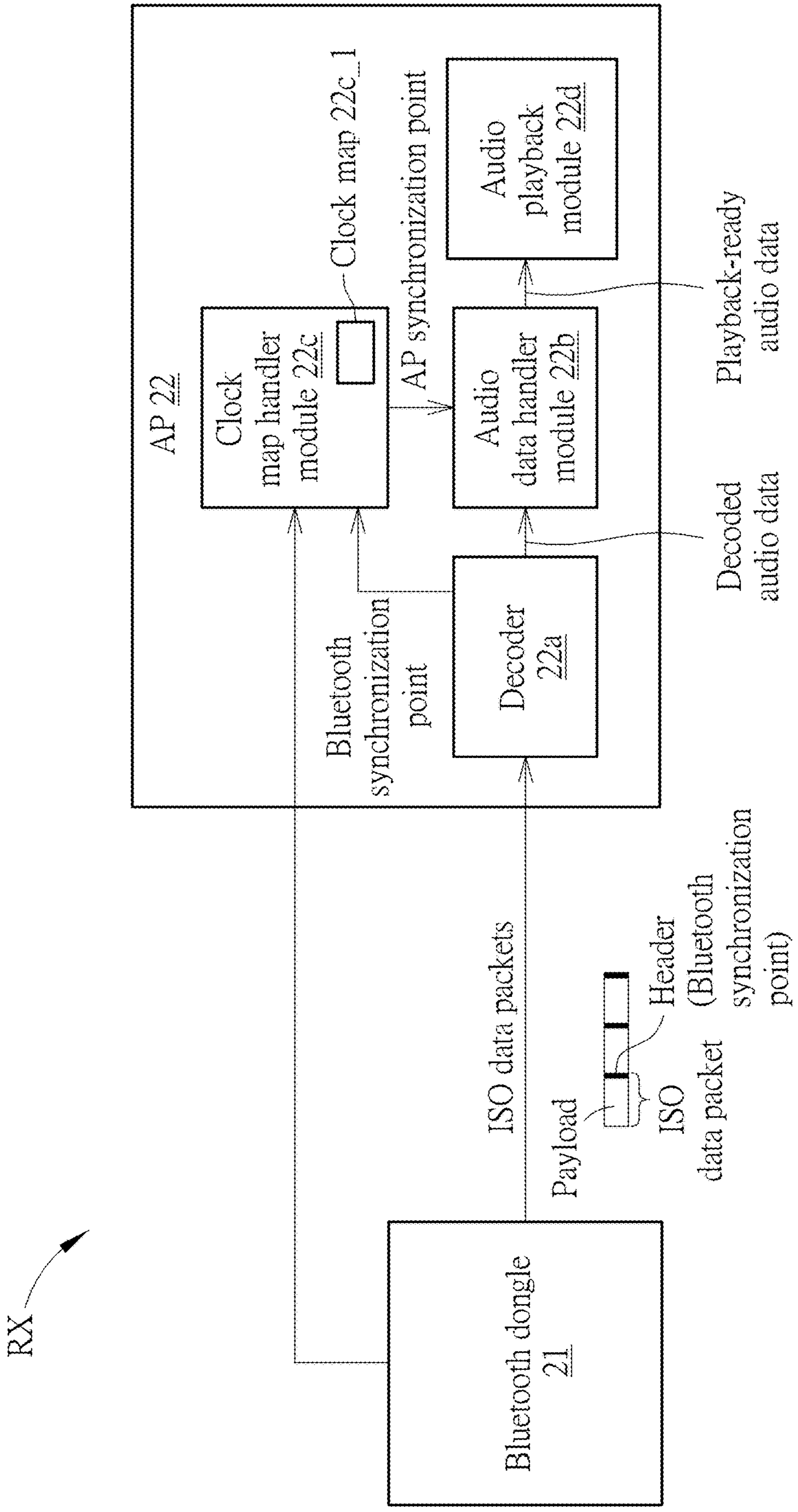
FIG. 3 is an illustration of signal formats of an audio receiver of the Bluetooth synchronization system in FIG. 1 and FIG. 2.

FIG. 3 is an illustration of signal formats of the receiver (RX) 20 of the Bluetooth synchronization system 100. As previously mentioned, the AP 22 includes the decoder 22*a*, the audio data handler module 22*b*, the clock map handler module 22*c*, and the audio playback module 22*d*. First, the Bluetooth dongle 21 outputs a plurality of isochronous (ISO) data packets. For single ISO data packet, the Bluetooth synchronization point can be determined according to the relevant information carried in a header of the ISO data packet. In the embodiment, the decoder 22*a* of the AP 22 parses and decodes the isochronous data packets for generating respective decoded audio data and Bluetooth synchronization point respectively. Here, the decoded audio data can be in a form of pulse code modulation (PCM). However, the format is not limited to the PCM format. Any reasonable format falls into the scope of the present disclosure. The decoded audio data (such as the PCM format) is inputted to the audio data handler module 22*b* of the AP 22. The Bluetooth synchronization points are inputted to the clock map handler module 22*c* of the AP 22. In the AP 22, the clock map handler module 22*c* can acquire running times of the Bluetooth dongle 21 and the AP 22 for generating the clock map 22*c*_1. For example, the clock map handler module 22*c* can acquire a plurality of running times of the Bluetooth dongle 11 and a plurality of running times of the AP 22 periodically, as the clock map 22*c*_1 shown in Table T1.

TABLE T1

| Running times of the Bluetooth dongle 11 | Running times of the AP 22 |
|---|---|
| Yb1 | Ya1 |
| Yb2 | Ya2 |
| Yb3 | Ya3 |
| . | . |
| . | . |
| . | . |
| Yb(latest) | Ya(latest) |

After the clock map 22*c*_1 is acquired by the clock map handler module 22*c*, a Bluetooth synchronization point can be converted into an AP synchronization point according to the clock map of the Bluetooth dongle and the AP. Then, the audio data handler module 22*b* can process the decoded audio data to generate a playback-ready audio data for the audio playback module 22*d* according to the converted AP synchronization points. It should be understood that the decoded audio data can be processed by using a data compressing process or a data extension process to generate the playback-ready audio data for avoiding under-run or over-run issues under different clocks of the AP 22 and the Bluetooth dongle 21. For example, assuming that the predetermined ISO data interval is 30 ms, the time duration of each decoded audio data is fixed, such as 30 ms. However, a time difference between two adjacent AP synchronization points (or a time difference between two adjacent target synchronization points) may be not equal to the ISO data interval, for example, the time difference may be 29.9 ms, 30.1 ms, 29.95 ms . . . . Hence, the decoded audio data can be processed by using a data compressing process or a data extension process for avoiding under-run or over-run issues under different clocks of the AP 22 and the Bluetooth dongle 21. The decoded or playback-ready audio data can be formed by the PCM. In the embodiment, the audio playback module 22*d* of the AP 22 is configured to play the playback-ready audio data for playing sound at the target synchronization point. In one embodiment, the playback-ready audio data may be a PCM data packet. Here, the target synchronization point can be defined by delaying a predetermined presentation delay from the AP synchronization point, for example, the target synchronization point=the AP synchronization point+the predetermined presentation delay. The presentation delay can be regarded as a reserved processing time. Therefore, the isochronous data packets and the playback-ready audio data can be fully synchronized between different chips (such as, the Bluetooth dongle 21 and the AP 22). As a result, when multiple audio devices are applied, they can receive the same data from the same audio sender, capable of playing audio simultaneously.

Figure 4:
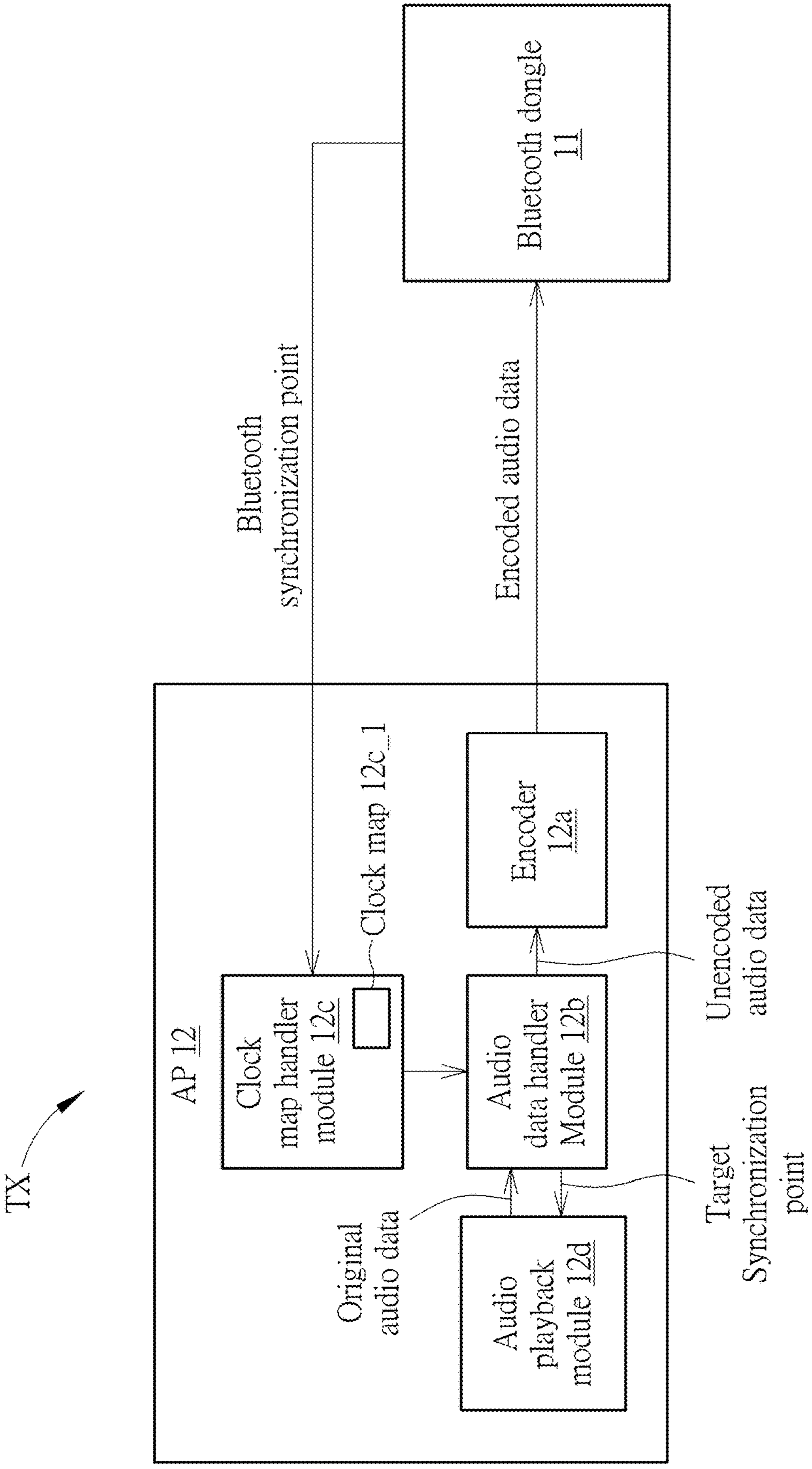
FIG. 4 is an illustration of signal formats of an audio sender of the Bluetooth synchronization system in FIG. 1 and FIG. 2.

FIG. 4 is an illustration of signal formats of the sender (TX) 10 of the Bluetooth synchronization system 100. As previously mentioned, the AP 12 includes the encoder 12*a*, the audio data handler module 12*b*, the clock map handler module 12*c*, and the audio playback module 12*d*. In the AP 12, the clock map handler module 12*c* can acquire a plurality of running times of the Bluetooth dongle 11 and the AP 12 periodically for generating the clock map 12*c*_1. For example, the clock map handler module 12*c* can acquire a plurality of running times of the Bluetooth dongle 11 and a plurality of running times of the AP 12 periodically, as the clock map 12*c*_1 shown in Table T2.

TABLE T2

| Running times of the Bluetooth dongle 11 | running times of the AP 12 |
|---|---|
| Yb1 | Ya1 |
| Yb2 | Ya2 |
| Yb3 | Ya3 |
| . | |
| . | |
| . | |
| Yb(latest) | Ya(latest) |

After the clock map 12*c*_1 is acquired by the clock map handler module 12*c*, the clock map handler module 12*c* can convert the Bluetooth synchronization point for the Bluetooth dongle 11 to an AP synchronization point for the AP 12. Then, the target synchronization point for the AP 12 can be derived according to the AP synchronization point for the AP 12 and the presentation delay. For example, the clock map handler module 12*c* can convert the Bluetooth synchronization point Sb to the AP synchronization point Sa (i.e., Detailed derivations are illustrated later). It should be understood that the original audio data can be processed by using the data compressing process or the data extension process for avoiding under-run or over-run issues under different clocks of the AP 12 and the Bluetooth dongle 11. In an embodiment, the AP 12 can acquire an audio data interval and an isochronous data interval, as illustrated previously. The AP 12 can obtain original audio data with a first duration from the buffer, wherein the first duration is determined according to the corresponding audio data interval. Then, the AP 12 can process the original audio data to generate an unencoded audio data with the second duration equaling to the isochronous data interval, for example, by using the data compressing process or the data extension process. The original or unencoded audio data can be formed by the PCM. After the unencoded audio data are obtained, the unencoded audio data is encoded by the encoder 12*a* and then transmitted to the Bluetooth dongle 11. Specifically, the original audio data with the first duration is processed by the audio playback module 12*d* of the AP 12 for playing sound at a target synchronization point. Here, the target synchronization point can be defined by delaying a presentation delay from the AP synchronization point. Therefore, adopting the proposed scheme, the sender (TX) 10 and the receiver (RX) 20 can play sound simultaneously. In the embodiment, the original audio data may have a time duration equaling to 29.9 ms, 29.95 ms, or 30.05 ms. Then, the audio data handler module 12*b* can process the original audio data having various durations as a "adjusted" audio data (referred to unencoded audio data in the disclosure) having a predetermined time duration which is related to the isochronous data interval, such as 30 ms. Here, the original or unencoded audio data is in a form of PCM format, and the encoded audio data can be generated according to another signal format. In one embodiment, after playing sound at one target synchronization point, the audio playback module 12*d* can be configured to play audio in sequence at a fixed sample rate.

Figure 5:
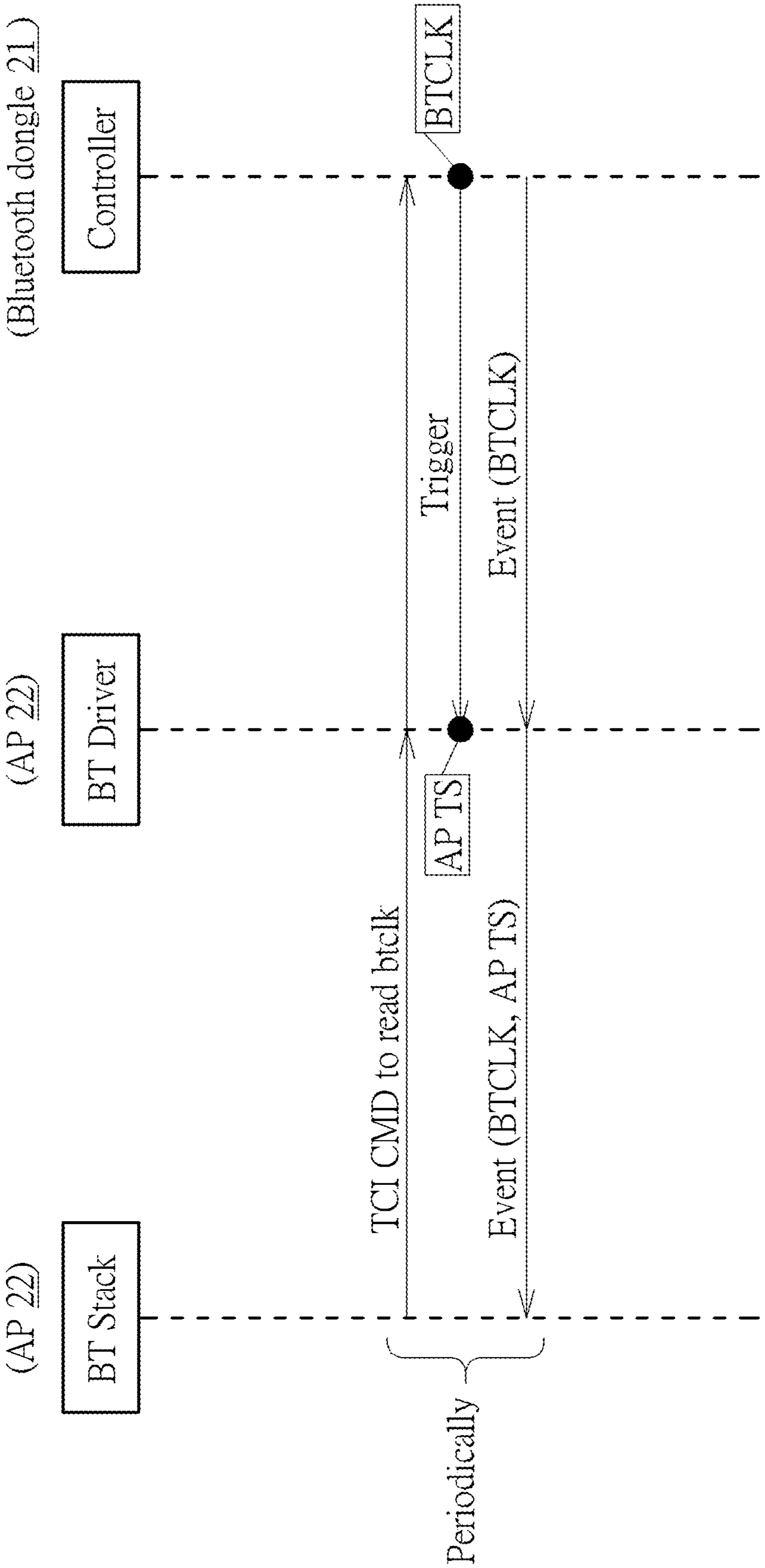
FIG. 5 is an illustration of signal flows for acquiring at least one running time of the Bluetooth dongle and at least one running time of an AP of the Bluetooth synchronization system in FIG. 1 and FIG. 2.

FIG. 5 is an illustration of signal flows for acquiring at least one running time of the Bluetooth dongle 21 and at least one running time of the AP 22 in the Bluetooth synchronization system 100. As previously mentioned, the clock map can be generated by acquiring clock information from different chips. For example, in FIG. 5, a Bluetooth stack of the AP 22 can generate a test commands interface (TCI) command. Then, the Bluetooth stack can transmit the TCI command to a controller (say, a micro control unit (MCU)) of the Bluetooth dongle 21. The TCI command can trigger the controller to read clock information (labeled as BTCLK) of the Bluetooth dongle 21. Therefore, the Bluetooth dongle 21 can acquire a running time of the Bluetooth dongle 21 after the Bluetooth dongle 21 receives the TCI command. Then, the Bluetooth dongle 21 can trigger a Bluetooth driver of the AP 22 through the GPIO communication flow to read the running time of the AP 22 by the AP 22. For example, after the Bluetooth driver of the AP 22 is triggered, the running time of the AP 22 (labeled as AP TS) can be identified. Finally, clock information (such as, the running time) of the Bluetooth dongle 21 and the AP 22 can be acquired by the Bluetooth stack of the AP 22. Hence, the clock information of the Bluetooth dongle 21 and the AP 22 can be derived by the AP 22. The signal flows for the sender (TX) 10 are similar to the receiver (RX) 20. Thus, details are omitted here.

Figure 6:
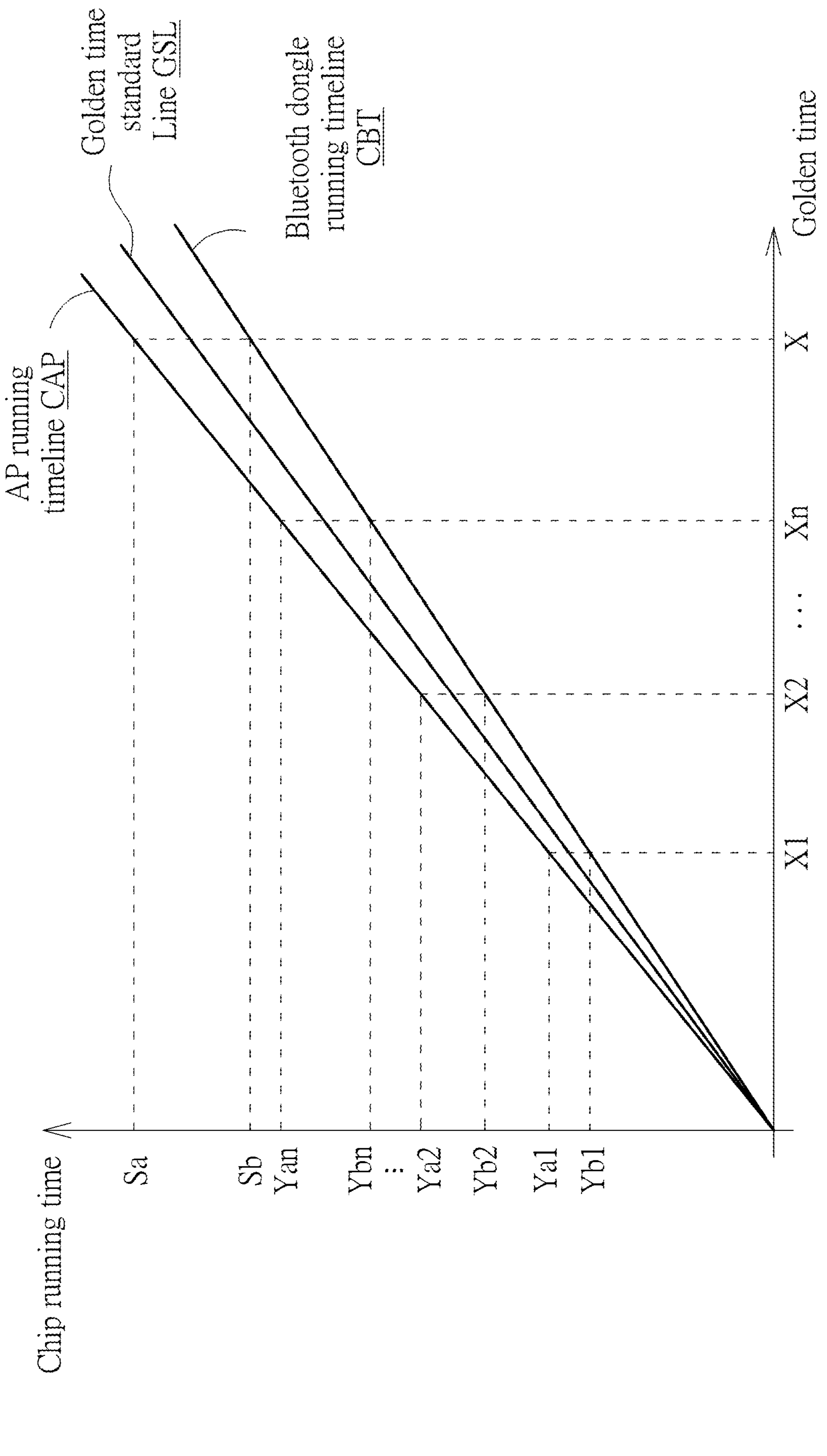
FIG. 6 is an illustration of generating an AP synchronization point according to a clock map of the Bluetooth synchronization system in FIG. 1 and FIG. 2.

FIG. 6 is an illustration of generating the AP synchronization point Sa according to the clock map 22c_1 of the Bluetooth synchronization system 100. In FIG. 6, x-axis represents as a golden time axis. Y-axis represents as a chip running time axis. A line with a slope equal to one represents as a golden time standard line GSL. An AP running timeline CAP and a Bluetooth dongle running timeline CBT are two running timelines having different slopes. When a golden time is equal to X1, a running time of the Bluetooth dongle 21 is equal to Yb1. A running time of the AP 22 is equal to Ya1. When a golden time is equal to X2, a running time of the Bluetooth dongle 21 is equal to Yb2. A running time of the AP 22 is equal to Ya2. Similarly, when a golden time is equal to Xn, a running time of the Bluetooth dongle 21 is equal to Ybn. A running time of the AP 22 is equal to Yan. Here, the clock information [Yb1, Ya1], [Yb2, Ya2], . . . , and [Ybn, Yan] are obtained periodically at predetermined intervals, wherein the predetermined interval can be denoted by L. For example, L can be 1 second. It should be noted that, in some embodiments of the present disclosure, the AP 22 is configured to periodically trigger the Bluetooth dongle 21 to read the running/operational/system time of the Bluetooth dongle 21. Consequently, the predetermined interval L is determined based on the system clock of the AP 22. In FIG. 6, the Bluetooth synchronization point Sb of the Bluetooth dongle 21 can be converted into the AP synchronization point Sa of the AP 22 by using a transfer function written as:

$$Sa = \frac{(Sb - Ybn) \times D}{L} + (Sb - Ybn) + Yan \qquad \text{(Eq 1)}$$

Here, Sa is the AP synchronization point of the AP 22. Sb is the Bluetooth synchronization point acquired from the Bluetooth dongle 21. Yan is a latest running time of the AP 22 on the clock map. Ybn is a latest running time of the Bluetooth dongle 21 on the clock map. L is the predetermined interval. D is an average normalization factor. Derivation details of the average normalization factor D are illustrated below. After the AP 22 acquires a plurality of running time (i.e., such as Yb1, Yb2, . . . ) of the Bluetooth dongle 21 and a plurality of running time (i.e., such as Ya1, Ya2, . . . ) of the AP 22, the clock map handler module 22*c* can acquire the average normalization factor D by the following derivation steps:

$$\text{delta} = [(Ya2 - Ya1) - (Yb2 - Yb1)]. \qquad 1$$

$$d = \frac{\text{delta} * \text{L}}{Yb2 - Yb1}. \qquad 2$$

3. continuously averaging d to update the average normalization factor D.

As a result, the average normalization factor D can be regarded as a moving average value for the plurality of running time (Yb1, Yb2, . . . ) and the plurality of running time (Ya1, Ya2, . . . ). Since the average normalization factor D can be regarded as the moving average value, the average normalization factor D can be used for filtering at least one jitter error of a chip running time distribution. Here, the jitter error may be introduced by the time difference of acquiring chip clocks or introduced by the unstable clock jitter of the chip. Any technology or hardware modification falls into the scope of the present disclosure.

Similarly, for the sender (TX) 10, the AP 12 can convert the Bluetooth synchronization point acquired from the Bluetooth dongle 11 into the AP synchronization point of the AP 12 by using the transfer function (Eq1). In the sender (TX) 10, D is the average normalization factor acquired according to a plurality of running time of the Bluetooth dongle 11 and a plurality of running time of the AP 12. Since the derivations of the sender (TX) 10 are similar to the derivations of the receiver (RX) 20, derivation details are omitted here.

Figure 7:
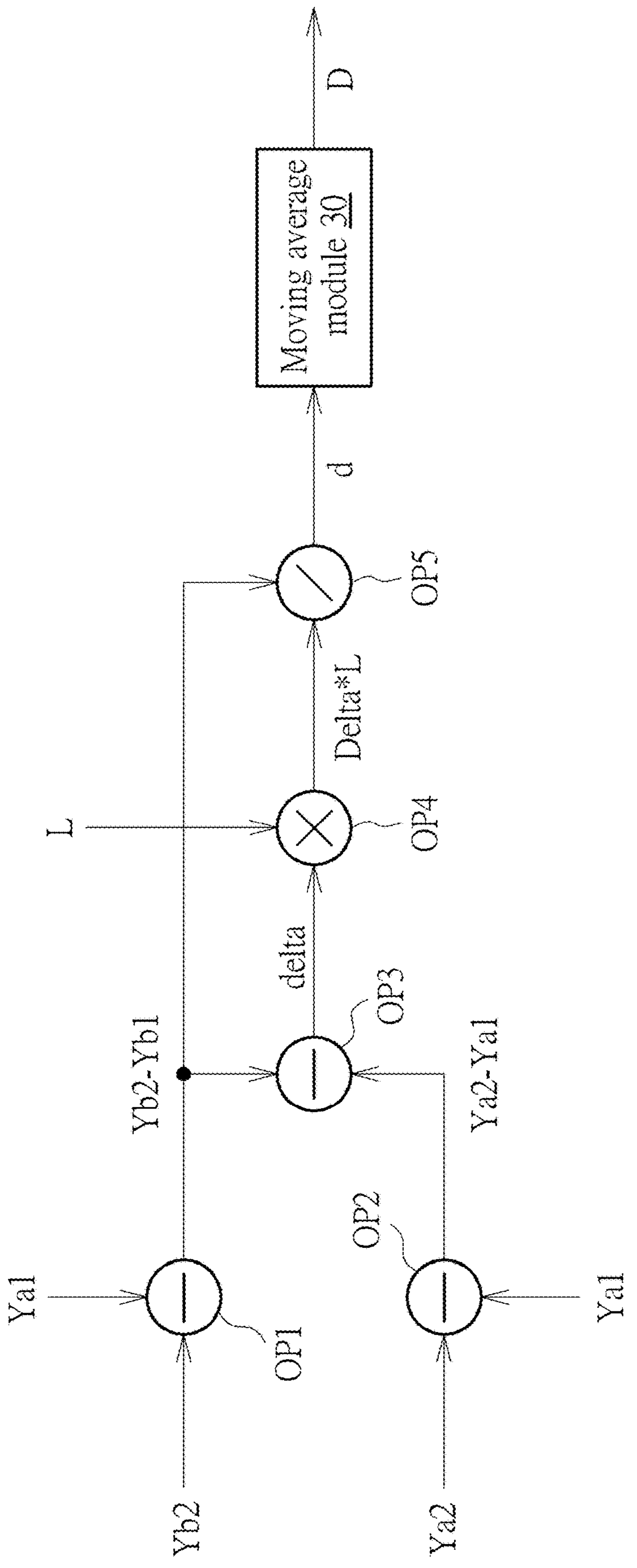
FIG. 7 is a logical structure of deriving an average normalization factor by a clock map handler module of the Bluetooth synchronization system in FIG. 1 and FIG. 2.

FIG. 7 is a logical structure of deriving the average normalization factor D by the clock map handler module 22*c* of the Bluetooth synchronization system 100. The clock map handler module 22*c* can include a first operation unit OP1, a second operation unit OP2, a third operation unit OP3, a fourth operation unit OP4, a fifth operation unit OP5, and a moving average module 30. The first operation unit OP1 can be used for subtracting a "previous" running time of the Bluetooth dongle 21 Yb1 from a "current" running time of the Bluetooth dongle 21 Yb2 to output Yb2-Yb1. The second operation unit OP2 can be used for subtracting a "previous" running time of the AP 22 Ya1 from a "current" running time of the AP 22 Ya2 to output Ya2-Ya1. The third operation unit OP3 is used for acquire a difference of Ya2−Ya1 and Yb2−Yb1, as delta=(Ya2−Ya1)−(Yb2−Yb1). The fourth operation unit OP4 is used for multiplying a predetermined period L with the difference of Ya2-Ya1 and Yb2-Yb1, as delta*L. The fifth operation unit OP5 is used for normalizing delta*L, as (delta*L)/(Yb2-Yb1). It can be understood that (delta*L)/(Yb2-Yb1) can be expressed as a general closed form, as:

$$d_m = \frac{\text{delta}(m) * L}{Yb(m+1) - Yb(m)}$$

for $$\text{delta}(m) = [Ya(m+1) - Ya(m)] - [Yb(m+1) - Yb(m)]$$

m is a sliding window index. In one embodiment, the moving average module 30 is used for averaging $d_m$ for all m. Therefore, the average normalization factor $D_m$ can be expressed as:

$$D_m = \text{average}\{d_m\} = \frac{\sum_{i=1}^{m} d_i}{m}, \text{ wherein } di = \frac{\text{delta}(i) * L}{Yb(i+1) - Yb(i)}$$

In another embodiment, the average normalization factor D can be derived by using a recursive method. In other words, the average normalization factor $D_m$ can be updated according to the previous average normalization factor $D_{m-1}$ and acquired $d_m$ as:

$$D_m = \frac{D_{m-1} * (m-1) + d_m}{m}$$

By using the recursive method for updating the average normalization factor D, additional memory utilization can be minimized. After the average normalization factor D is acquired, the AP synchronization point Sa of the AP 22 can be derived by the equation (Eq1). Further, the target synchronization point T can be defined as:

$$T = Sa + PD$$

PD is a given presentation delay. Further, the structures and derivations of sender (TX) are similar to the derivations of receiver (RX). Thus, similar details are omitted here.

Figure 8:
FIG. 8 is an illustration of operation by an audio data handler module of the Bluetooth synchronization system in FIG. 1 and FIG. 2.

FIG. 8 is an illustration of operation by the audio data handler module 22*b* of the Bluetooth synchronization system 100. The audio data handler module 22*b* can convert the decoded audio data having the isochronous data interval LBT into the playback-ready audio data having the audio data interval LAP. For example, Sb(m) is used for representing a Bluetooth synchronization point of m-th decoded audio data. The next Bluetooth synchronization point Sb(m+1) can be expressed as Sb(m+1)=Sb(m)+isochronous data interval LBT. As previously mentioned, the AP synchronization point Sa(m) of m-th playback-ready audio data can be derived from Sb(m) according to (Eq1). Further, the next AP synchronization point Sa(m+1) of (m+1)-th playback-ready audio data can be derived from Sb(m+1) according to (Eq1). Since the AP synchronization points Sa(m) and Sa(m+1) can be derived, the audio data interval LAP can be acquired by Sa(m+1)−Sa(m). It should be understood that the isochronous data interval LBT and the audio data interval LAP may be different. For example, assuming that the isochronous data interval LBT is 30 ms, however, in practice, the audio data interval LAP may vary slightly, such as 29.9 ms, 30.1 ms, 29.95 ms, 30.05 ms, and so on. When the audio data interval LAP is longer than the isochronous data interval LBT, the decoded audio data may be extended for generating the playback-ready audio data. When the audio data interval LAP is shorter than the isochronous data interval LBT, the decoded audio data may be compressed for generating the playback-ready audio data. In other words, in the embodiments of the present disclosure, the AP 22 generates the playback-ready audio data from the decoded audio data according to the derived AP synchronization points. The playback-ready audio data are generated based on the isochronous data interval LBT (for example, the isochronous data interval LBT may be a predefined value, such as 30 ms or 20 ms) and the audio data interval LAP (which is calculated according to two adjacent AP synchronization points). Any reasonable or technology modification falls into the scope of the present disclosure. Further, conversion between the original audio data and the unencoded audio data of the sender (TX) is similar to the receiver (RX), and has described in the previous embodiment. Thus, details are omitted here.

Figure 9:
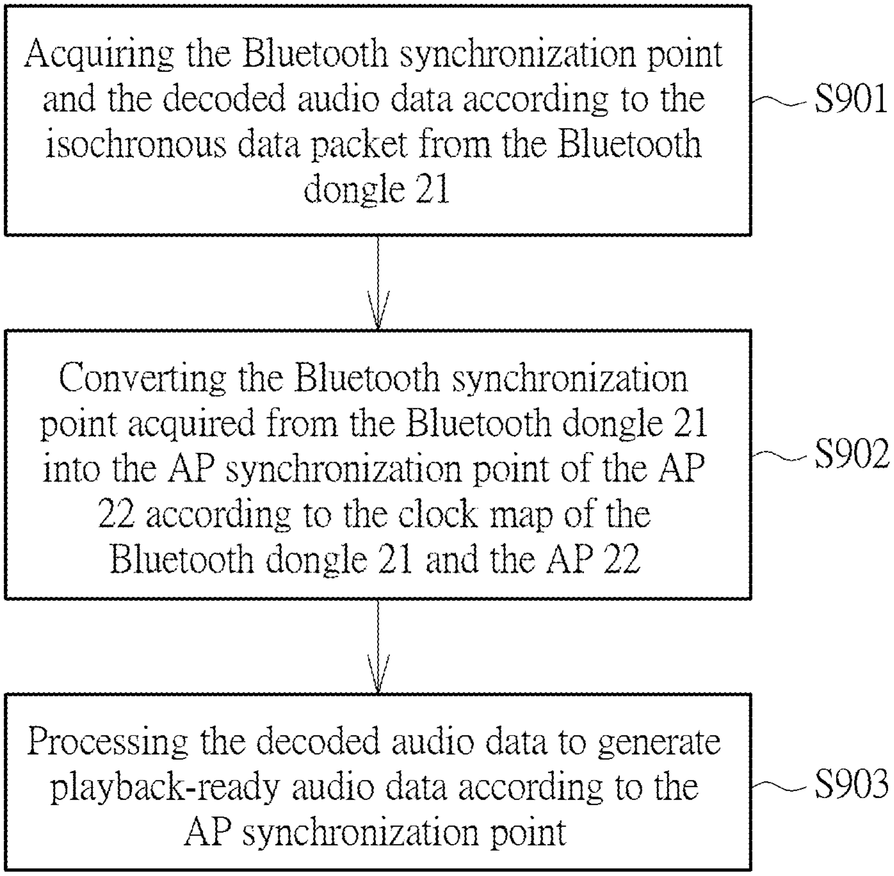
FIG. 9 is a flow chart of performing a Bluetooth synchronization method by the audio receiver of the Bluetooth synchronization system in FIG. 1 and FIG. 2.

FIG. 9 is a flow chart of performing a Bluetooth synchronization method by the receiver (RX) 20 of the Bluetooth synchronization system 100. The Bluetooth synchronization method (performed by receiver (RX) 20) can include step S901 to step S903. Any reasonable or technology modification falls into the scope of the present disclosure. Step S901 to step S903 are illustrated below.

step S901: acquiring the Bluetooth synchronization point and the decoded audio data according to the isochronous data packet from the Bluetooth dongle 21;

step S902: converting the Bluetooth synchronization point acquired from the Bluetooth dongle 21 into the AP synchronization point of the AP 22 according to the clock map of the Bluetooth dongle 21 and the AP 22;

step S903: processing the decoded audio data to generate playback-ready audio data according to the AP synchronization point.

Details of the step S901 to step S903 are previously illustrated. Thus, they are omitted here. In the receiver (RX) 20 of the Bluetooth synchronization system 100, the isochronous data packets and the playback-ready audio data are synchronized. The target synchronization point is defined by delaying the presentation delay from the AP synchronization point. Therefore, even if an auracast (broadcast) communication or a unicast communication is applied to the Bluetooth synchronization system 100, all LeAudio receiver speakers can play sound simultaneously.

Figure 10:
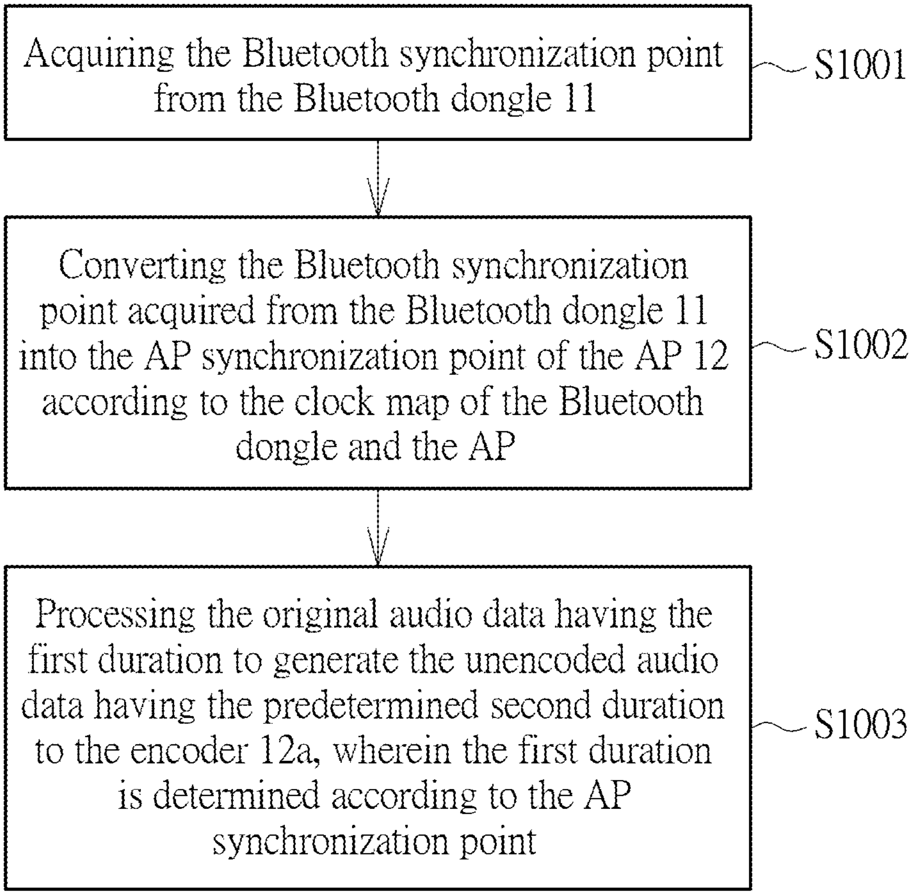
FIG. 10 is a flow chart of performing a Bluetooth synchronization method by the audio sender of the Bluetooth synchronization system in FIG. 1 and FIG. 2.

FIG. 10 is a flow chart of performing a Bluetooth synchronization method by the sender (TX) 10 of the Bluetooth synchronization system 100. The Bluetooth synchronization method (performed by the sender (TX) 10) can include step S1001 to step S1003. Any reasonable or technology modification falls into the scope of the present disclosure. Step S1001 to step S1003 are illustrated below.

step S1001: acquiring the Bluetooth synchronization point from the Bluetooth dongle 11;

step S1002: converting the Bluetooth synchronization point acquired from the Bluetooth dongle 11 into the AP synchronization point of the AP 12 according to the clock map of the Bluetooth dongle and the AP step S1003: processing the original audio data having the first duration to generate the unencoded audio data having the predetermined second duration to the encoder 12*a*, wherein the first duration is determined according to the AP synchronization point.

Details of the step S1001 to step S1003 are previously illustrated. Thus, they are omitted here. In the sender (TX) 10 of the Bluetooth synchronization system 100, the isochronous data packets and the sender audio data packets are synchronized. The target synchronization point is defined by delaying the presentation delay from the AP synchronization point. Therefore, the sender (TX) 10 and the receiver (RX) 20 can play sound simultaneously.

To sum up, the present disclosure discloses a Bluetooth synchronization method and a Bluetooth synchronization system. The Bluetooth synchronization system can be applied to a Bluetooth LE Audio standard for an auracast (broadcast) communication or a unicast communication. In the Bluetooth synchronization system, the isochronous data packets and the playback-ready audio data are synchronized. Therefore, in the receiver, since the audio playback module can output sound data according to the target synchronization point accurately, all LeAudio receiver speakers can play sound simultaneously. In the sender, when the AP and the receiver SoC are fully negotiated, the sender and the receiver can play sound simultaneously.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A Bluetooth synchronization method applied to an audio receiver, wherein the audio receiver comprises a Bluetooth dongle and an application processor (AP), the method comprising:

acquiring a Bluetooth synchronization point and decoded audio data according to an isochronous data packet from the Bluetooth dongle;

acquiring a plurality of running times of the Bluetooth dongle periodically;

acquiring a plurality of running times of the AP periodically;

acquiring an average normalization factor according to the plurality of running times of the Bluetooth dongle and the plurality of running times of the AP;

converting the Bluetooth synchronization point into an AP synchronization point of the AP according to a clock map of the Bluetooth dongle and the AP, wherein converting the Bluetooth synchronization point into the AP synchronization point of the AP according to the clock map of the Bluetooth dongle and the AP comprises:

converting the Bluetooth synchronization point into the AP synchronization point of the AP by using a transfer function written as:

$$Sa = \frac{(Sb - Ybn) \times D}{L} + (Sb - Ybn) + Yan;$$

and processing the decoded audio data to generate playback-ready audio data according to the AP synchronization point;

wherein the Bluetooth dongle and the AP have different clock sources, the clock map is configured to record the plurality of running times of the Bluetooth dongle and the plurality of running times of the AP, Sa is the AP synchronization point of the AP, Sb is the Bluetooth synchronization point acquired from the Bluetooth dongle, Yan is a latest running time of the AP on the clock map, Ybn is a latest running time of the Bluetooth dongle on the clock map, L is a predetermined interval determined based on a system clock of the AP, and D is the average normalization factor.

2. The method of claim 1, further comprising:

updating the average normalization factor by using a recursive function as:

$$D_m = \frac{D_{m-1} * (m-1) + d_m}{m}$$

wherein $D_m$ is m-th average normalization factor, $d_m$ is m-th normalization factor determined according to the predetermined interval, a time difference of the m-th adjacent running times of the Bluetooth dongle, and a time difference of m-th adjacent running times of the AP.

3. The method of claim 1, further comprising:

generating a test commands interface (TCI) command by the AP;

transmitting the TCI command from the AP to the Bluetooth dongle;

acquiring a running time of the Bluetooth dongle after the Bluetooth dongle receives the TCI command; and triggering the AP to read a running time of the AP by a general-purpose input/output (GPIO) communication flow; wherein the clock map is configured to record the running time of the Bluetooth dongle and the running time of the AP.

4. The method of claim 1, wherein processing the decoded audio data to generate the playback-ready audio data according to the AP synchronization point comprises:

processing the decoded audio data to generate the playback-ready audio data according to a time difference between two adjacent AP synchronization points after the two adjacent AP synchronization points acquired.

5. The method of claim 4, further comprising:

playing the playback-ready audio data at a target synchronization point;

wherein the decoded audio data and the playback-ready audio data are in a form of a pulse code modulation (PCM), and the target synchronization point is generated according to a predetermined presentation delay and the AP synchronization point.

6. A Bluetooth synchronization method applied to an audio sender, wherein the audio sender comprises a Bluetooth dongle and an application processor (AP), the method comprising:

acquiring a Bluetooth synchronization point from the Bluetooth dongle;

converting the Bluetooth synchronization point into an AP synchronization point of the AP according to a clock map of the Bluetooth dongle and the AP, wherein converting the Bluetooth synchronization point into the AP synchronization point of the AP according to the clock map of the Bluetooth dongle and the AP comprises:

converting the Bluetooth synchronization point into the AP synchronization point of the AP by using a transfer function written as:

$$Sa = \frac{(Sb - Ybn) \times D}{L} + (Sb - Ybn) + Yan;$$

and processing an original audio data having a first duration to generate an unencoded audio data having a predetermined second duration to an encoder, wherein the first duration is determined according to the AP synchronization point;

wherein the Bluetooth dongle and the AP have different clock sources, Sa is the AP synchronization point of the AP, Sb is the Bluetooth synchronization point acquired from the Bluetooth dongle, Yan is a latest running time of the AP on the clock map, Ybn is a latest running time of the Bluetooth dongle on the clock map, L is a predetermined interval determined based on a system clock of the AP, D is an average normalization factor acquired according to a plurality of running times of the Bluetooth dongle and a plurality of running times of the AP recorded in the clock map; and wherein the audio sender is configured to play the original audio data having the first duration at a target synchronization point, and the target synchronization point is generated by delaying a predetermined presentation delay from the AP synchronization point.

7. The method of claim 6, further comprising:

encoding the unencoded audio data for generating encoded audio data; and transmitting the encoded audio data through the Bluetooth dongle;

wherein the original audio data and the unencoded audio data are in a form of a pulse code modulation (PCM).

8. A Bluetooth synchronization system comprising:

a Bluetooth dongle; and an application processor (AP) coupled to the Bluetooth dongle;

wherein the AP is configured to perform the following steps:

acquiring a Bluetooth synchronization point and decoded audio data according to an isochronous data packet from the Bluetooth dongle;

acquiring a plurality of running times of the Bluetooth dongle periodically;

acquiring a plurality of running times of the AP periodically;

acquiring an average normalization factor according to the plurality of running times of the Bluetooth dongle and the plurality of running times of the AP;

converting the Bluetooth synchronization point into an AP synchronization point of the AP according to a clock map of the Bluetooth dongle and the AP, wherein the AP is configured to convert the Bluetooth synchronization point into the AP synchronization point of the AP by using a transfer function written as:

$$Sa = \frac{(Sb - Ybn) \times D}{L} + (Sb - Ybn) + Yan;$$

and processing the decoded audio data to generate playback-ready audio data according to the AP synchronization point;

wherein the Bluetooth dongle and the AP are within an audio receiver of the Bluetooth synchronization system, and have different clock sources, the clock map is configured to record the plurality of running times of the Bluetooth dongle and the plurality of running times of the AP, Sa is the AP synchronization point of the AP, Sb is the Bluetooth synchronization point acquired from the Bluetooth dongle, Yan is a latest running time of the AP on the clock map, Ybn is a latest running time of the Bluetooth dongle on the clock map, L is a predetermined interval determined based on a system clock of the AP, and D is the average normalization factor.

9. The system of claim 8, wherein the AP is further configured to update the average normalization factor by using a recursive function as:

$$D_m = \frac{D_{m-1} * (m-1) + d_m}{m}$$

wherein $D_m$ is m-th average normalization factor, $d_m$ is m-th normalization factor determined according to the predetermined interval, a time difference of the m-th adjacent running times of the Bluetooth dongle, and a time difference of m-th adjacent running times of the AP.

10. The system of claim 8, wherein the AP is further configured to generate a test commands interface (TCI) command and output the TCI command to the Bluetooth dongle, the Bluetooth dongle is configured to acquire a running time of the Bluetooth dongle after the Bluetooth dongle receives the TCI command and triggers the AP to read a running time of the AP by a general-purpose input/output (GPIO) communication flow; wherein the clock map of the Bluetooth dongle and the AP is acquired by the AP and the clock map is configured to record the running time of the Bluetooth dongle and the running time of the AP.

11. The system of claim 8, wherein the AP is further configured to process the decoded audio data to generate the playback-ready audio data according to a time difference between two adjacent AP synchronization points after the two adjacent AP synchronization points acquired.

12. The system of claim 11, wherein the AP is further configured to play the playback-ready audio data at a target synchronization point, the decoded audio data and the playback-ready audio data are in a form of a pulse code modulation (PCM), and the target synchronization point is generated by delaying a presentation delay from the AP synchronization point.

13. The system of claim 8, further comprising:

another Bluetooth dongle; and another AP coupled to another Bluetooth dongle;

wherein another AP is configured to perform the following steps:

acquiring a Bluetooth synchronization point from another Bluetooth dongle;

converting the Bluetooth synchronization point acquired from another Bluetooth dongle into an AP synchronization point of another AP according to another clock map of the another Bluetooth dongle and the another AP; and processing an original audio data having a first duration to generate an unencoded audio data having a predetermined second duration, wherein the first duration is determined according to the AP synchronization point;

wherein another Bluetooth dongle and another AP are within an audio sender of the Bluetooth synchronization system, and have individual and different clock sources; and wherein the audio sender is configured to play the original audio data having the first duration at a target synchronization point, and the target synchronization point is generated by delaying a predetermined presentation delay from the AP synchronization point of another AP.

14. The system of claim 13, wherein another AP is further configured to convert the Bluetooth synchronization point acquired from another Bluetooth dongle into the AP synchronization point of another AP by using a transfer function written as:

$$Sa = \frac{(Sb - Ybn) \times D}{L} + (Sb - Ybn) + Yan$$

wherein Sa is the AP synchronization point of the another AP, Sb is the Bluetooth synchronization point acquired from the another Bluetooth dongle, Y an is a latest running time of the another AP on the another clock map, Y bn is a latest running time of the another Bluetooth dongle on the another clock map, L is a predetermined interval determined based on a system clock of the another AP, D is an average normalization factor acquired according to a plurality of running times of the another Bluetooth dongle and a plurality of running times of the another AP recorded in the another clock map.

15. The system of claim 14, wherein another AP is further configured to perform the following steps:

encoding the unencoded audio data for generating an encoded audio data; and transmitting the encoded audio data through another Bluetooth dongle;

wherein the original audio data and the unencoded audio data are in a form of a pulse code modulation (PCM).

* * * * *